United States Patent
Garceau et al.

(10) Patent No.: US 7,231,749 B2
(45) Date of Patent: Jun. 19, 2007

(54) APPARATUS AND SYSTEM FOR DETECTING UNDER-FILLED CUSHIONS

(75) Inventors: Mark Garceau, Bethlehem, CT (US); Paul Van Huis, Whithall, NY (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 10/933,195

(22) Filed: Sep. 2, 2004

(65) Prior Publication Data

US 2006/0042190 A1    Mar. 2, 2006

(51) Int. Cl.
  *B65B 1/38*   (2006.01)
  *B65B 57/04*  (2006.01)
  *B65B 31/04*  (2006.01)

(52) U.S. Cl. ................ 53/403; 53/494; 53/498; 53/504; 53/507; 53/69

(58) Field of Classification Search .......... 53/403, 53/494, 498, 500, 504, 69, 503, 507; 198/341.03, 198/502.2, 435, 443, 444; 73/41, 49.3
See application file for complete search history.

(56) References Cited

U.S. PATENT DOCUMENTS

| | | | |
|---|---|---|---|
| 238,220 A | 3/1881 | Davies | |
| 2,836,415 A | 5/1958 | Rohdin | |
| 3,319,784 A * | 5/1967 | Granger | ............... 209/602 |
| 3,817,803 A | 6/1974 | Horsky | |
| 3,902,954 A | 9/1975 | Lotto | |
| 4,148,213 A * | 4/1979 | Prakken | ............... 73/45.4 |
| 4,149,484 A | 4/1979 | Koch | |
| 4,284,187 A * | 8/1981 | Kramer et al. | ............... 198/435 |
| 4,697,452 A * | 10/1987 | Prakken | ............... 73/49.3 |
| 4,756,399 A | 7/1988 | Scata | |

(Continued)

FOREIGN PATENT DOCUMENTS

DE         43 23 566        1/1995

(Continued)

OTHER PUBLICATIONS

Product Brochure, Airfil U.S.A., "Airfil: The flexible approach to air-filled packaging," Jan. 1998.

(Continued)

*Primary Examiner*—Louis K. Huynh
*Assistant Examiner*—Gloria R. Weeks
(74) *Attorney, Agent, or Firm*—Alston & Bird LLP

(57) ABSTRACT

The invention is an under-filled cushion detector that is capable of conveying a string of packaging cushions and detecting whether the string of packaging cushions may be under-filled. The detector includes an upper driven belt that is movably suspended above a lower belt. The belts cooperate together to define a longitudinal cushion pathway between the belts. The distance between the upper and lower belts may vary depending upon the thickness of the string of packaging cushions. If a string of under-filled cushions travels between the upper and lower belts, the upper belt can move downwardly in the direction of the lower belt. A switch stops the upper and lower belts if the height of the cushion pathway decreases below a predetermined threshold. The detector can be used in a system for manufacturing and transporting packaging cushions to a desired location.

26 Claims, 8 Drawing Sheets

U.S. PATENT DOCUMENTS

| | | | |
|---|---|---|---|
| 4,921,155 A | | 5/1990 | Ito et al. |
| 5,054,620 A | * | 10/1991 | DeWitt et al. ............... 209/3.1 |
| 5,216,868 A | | 6/1993 | Cooper et al. |
| 5,244,196 A | * | 9/1993 | Walter et al. ................. 270/46 |
| 5,284,003 A | | 2/1994 | Goodman et al. |
| 5,340,632 A | | 8/1994 | Chappuis |
| 5,458,051 A | * | 10/1995 | Alden et al. ................... 99/349 |
| 5,655,356 A | * | 8/1997 | Ginestra et al. ............... 53/504 |
| 5,732,609 A | | 3/1998 | Marschke |
| 5,740,661 A | * | 4/1998 | Yamaguchi et al. .......... 53/553 |
| 5,786,530 A | * | 7/1998 | Fenlon ....................... 73/49.3 |
| 5,794,406 A | * | 8/1998 | Reichental et al. ............ 53/410 |
| 5,802,803 A | * | 9/1998 | Kitagawa et al. ............... 53/54 |
| 5,881,532 A | | 3/1999 | Kitagawa ....................... 53/54 |
| 5,904,237 A | * | 5/1999 | Sander et al. ............. 198/502.2 |
| 5,942,076 A | | 8/1999 | Salerno et al. |
| 5,979,891 A | * | 11/1999 | Roux .......................... 271/225 |
| RE36,501 E | | 1/2000 | Hoover et al. |
| 6,061,996 A | | 5/2000 | Vissers et al. |
| 6,164,585 A | * | 12/2000 | Lutz ........................... 242/528 |
| 6,195,966 B1 | * | 3/2001 | Shomron et al. .............. 53/451 |
| 6,199,349 B1 | * | 3/2001 | Lerner ......................... 53/472 |
| 6,428,246 B1 | | 8/2002 | Landrum |
| 6,453,644 B1 | | 9/2002 | Baker |
| 6,474,141 B1 | * | 11/2002 | Takaoka et al. .............. 73/49.3 |
| 6,536,183 B1 | * | 3/2003 | Brown .......................... 53/79 |
| 6,550,603 B1 | | 4/2003 | Beach et al. |
| 6,568,247 B2 | * | 5/2003 | Taylor ......................... 73/49.3 |
| 6,941,796 B2 | * | 9/2005 | Bennett ........................ 73/49.3 |
| 2003/0209406 A1 | * | 11/2003 | Jones .......................... 198/443 |
| 2005/0172736 A1 | * | 8/2005 | Kumagai et al. .......... 73/865.8 |
| 2005/0178085 A1 | * | 8/2005 | Huis et al. .................... 53/403 |

FOREIGN PATENT DOCUMENTS

| | | |
|---|---|---|
| DE | 195 42 651 | 1/1997 |
| EP | 0 540 148 | 5/1993 |
| EP | 1 344 727 A | 9/2003 |
| FR | 2 678 529 | 1/1991 |
| JP | 59 086508 | 5/1984 |
| JP | 4-331092 | 11/1992 |
| NL | 1015126 | 11/2001 |
| WO | WO 02/064358 A2 | 8/2002 |

OTHER PUBLICATIONS

Packaging Magazine, vol. 1, issue 11, "End of Line Joint Effort" p. 14, Jun. 4, 1998.
European Search Report for 05255402.9 dated Dec. 7, 2005.

* cited by examiner

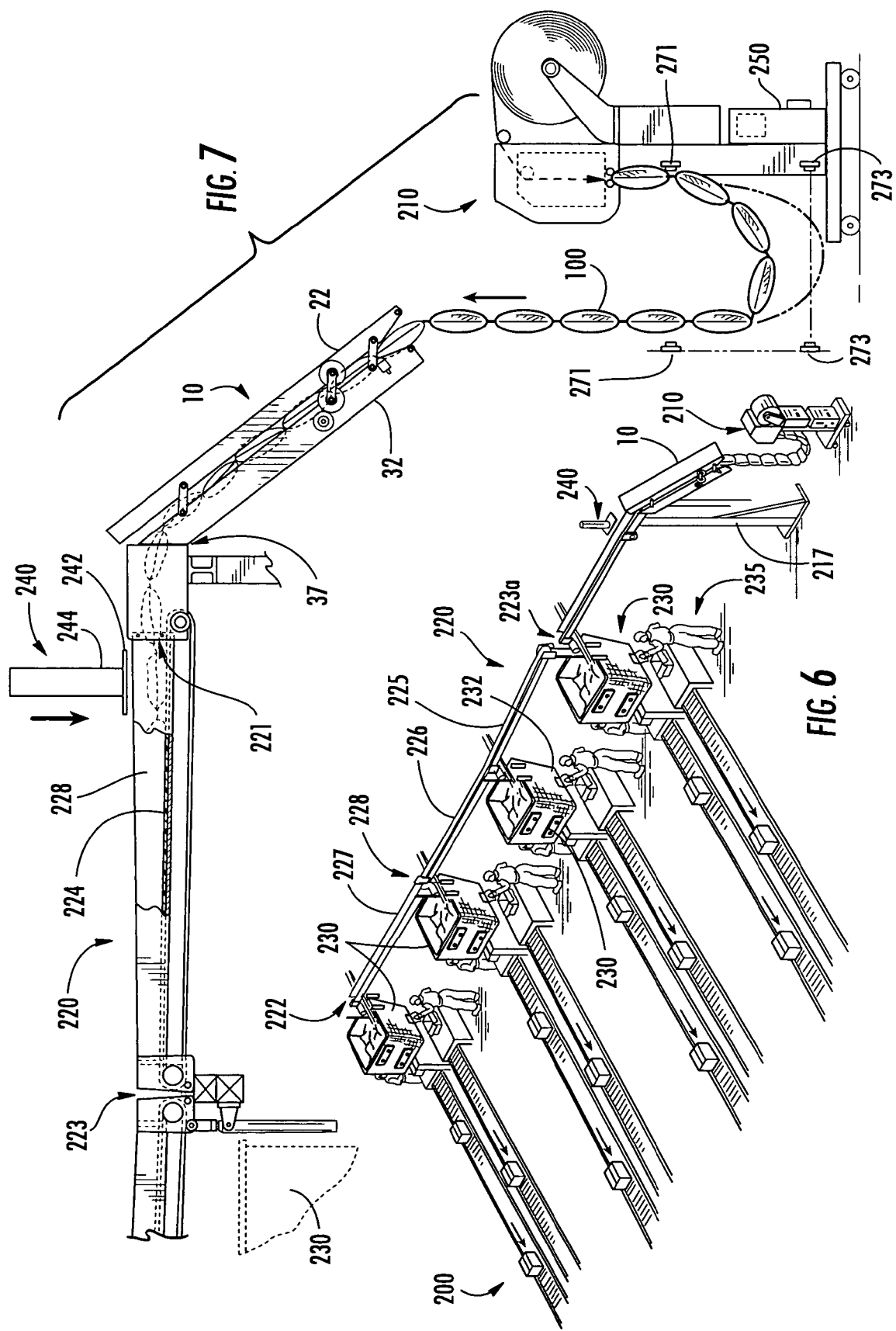

APPARATUS AND SYSTEM FOR DETECTING UNDER-FILLED CUSHIONS

BACKGROUND OF THE INVENTION

The invention relates generally to devices for preparing inflated packaging cushions, and more particularly to devices for detecting under-filled packaging cushions.

When articles are packaged in a container or box for shipping, there are usually void spaces in the container. Protective packaging material for articles of different sizes and shapes is commonly used to cushion articles during shipping. Numerous types and forms of packaging material for this purpose have been used, including waste paper, embossed paper, laminated bubble paper, foamed material and plastic beads. These packaging materials do not always provide the cushioning and void fill most effective to protect articles during shipment. These packaging materials can be costly and often require that a significant amount of labor be performed at the packing station.

Thermoplastic cellular cushions containing air have been developed for use as packaging material. Examples of methods of making such cellular cushions are shown in U.S. Pat. Nos. 3,817,803 and 5,340,632. Another example of a device for making cushions is U.S. Pat. No. 5,942,076, which describes a machine that includes sealing sheets of thermoplastic material together to form a tube, introducing air to the tubular material and sealing the ends to make rectangular air-filled cushions of various sizes. The cushion making machine is normally located adjacent a product conveyer. The products are typically placed into boxes or other containers, and packaging cushions from the cushion making machine are used to pack the product.

Various packaging systems have been developed for delivering strings of packaging cushions to one or more packaging stations. U.S. Pat. No. 6,536,183 describes a system for producing and delivering packaging cushions to a point of use in which a continuous string of the cushions is fed into an elongated duct with the string extending longitudinally of the duct. An air flow is established in the duct to convey the string of cushions through the duct to the point of use. In U.S. Pat. No. 6,428,246 there is disclosed a system and method for making, conveying and dispensing a string of packaging cushions to one or more packaging stations. The system includes a pressurized pathway to an elongated hopper located above a plurality of packing stations. The elongated hopper includes air jets that transfer the string of packaging cushions between each jet to a remote end of the hopper. Located at intervals along the length of the hopper are a series of dispensing openings so the cushions may be accessed at each of the packing stations. U.S. patent application Ser. No. 10/780,176 describes a system that uses a series of conveyor belts to deliver and feed strings of packaging cushions to one or more packaging stations.

The above described systems commonly use air or mechanical conveyors to deliver strings of packaging cushions from a cushion forming machine to a plurality of hoppers that are generally located near a packaging station. During packaging operations, an operator may remove a desired amount of packaging cushions from the hopper. Sometimes, the string of cushions delivered to the packaging stations may be deflated or under-filled. Improperly inflated cushions are typically discarded. Delivering improperly inflated cushions to the packaging stations may result in packaging delays and wasted materials. In some cases, packaging production may be delayed until properly inflated packaging cushions can be supplied to the packaging stations. U.S. Pat. No. 6,453,644 describes an air-conveyance system that includes a probe in the form of a whisker trigger for detecting whether a cushion is deflated. The probe interrupts power to the air pillow cushion machine when a single deflated bag is detected. Stopping and starting the cushion machine every time a single deflated packaging cushion is detected may be inefficient, burdensome, and there may be circumstances where it is desirable to stop and restart the machine only if the cushion machine is malfunctioning or an extended string of under-filled cushions is detected.

Thus, there still exists a need for an apparatus and system for detecting under-filled packaging cushions when an extended length of under-filled packaging cushions has been detected or when the cushion machine is malfunctioning.

BRIEF SUMMARY OF THE INVENTION

The invention comprises an under-filled cushion detector that is capable of conveying a string of packaging cushions and detecting whether the string of packaging cushions may be under-filled or deflated. The under-filled cushion detector is adeptly suited to be used in a system for manufacturing and transporting packaging cushions to a desired location. The under-filled cushion detector may be used to help prevent preparing multiple strings of under-filled packaging cushions and from transporting the under-filled packaging cushions to a packaging station.

In one embodiment, the under-filled cushion detector comprises a pair of endless belts that are disposed one above the other and wherein at least one of the belts is driven in a forward direction. The upper belt is movably suspended above the lower belt. The upper and lower belts cooperate together to define a longitudinal cushion pathway between the belts through which the cushions are conveyed. The upper belt is typically movably suspended or "floating" above the lower belt so that the distance between the upper and lower belts may vary depending upon the thickness of the string of packaging cushions. If a string segment of under-filled or deflated packaging cushions travels between the upper and lower belts, the upper belt can move downwardly in the direction of the lower belt and thereby decrease the height of the cushion pathway. The under-filled cushion detector may also comprise a detector that is capable of stopping the upper and lower belts if the height of the cushion pathway decreases below a predetermined threshold. As a result, the invention may be used to help prevent the manufacture and/or conveyance of under-filled packaging cushions.

In one embodiment, the under-filled cushion detector includes a plurality of support members that are adapted to movably suspend the upper belt above the lower belt. The support members each have a proximal end that is pivotably attached to the upper belt, and a distal end that is pivotably attached to the lower belt. When a string of packaging cushions travels between the belts, the support members can pivot at both the proximal and distal ends, which results in movement of the upper belt towards or away from the lower belt. As a result, the position of the upper belt with respect to the lower belt is "self-adjusting" and may vary depending upon the thickness of the packaging cushions.

In some embodiments, the lower and upper belts are each driven in a forward direction and may comprise conveyor belts that work in conjunction to convey and transport strings of packaging cushions in a desired location. Typically, the upper and lower driven belts are arranged in a face-to-face orientation so that each belt cooperates with the other belt to drive the string of packaging cushions forward. In some embodiments, the upper and lower belts may each be separately supported by upper and lower housing members, respectively.

In one embodiment, the invention comprises a system for producing and transporting a string of packaging cushions. The system may comprise a machine capable of producing a string of packaging cushions and an under-filled cushion detector adapted for detecting a string of under-filled cushions. The system may also include a controller that is adapted for controlling the operations of the cushion making machine and the under-filled cushion detector. In the event under-filled cushions are detected, the controller can direct the upper and lower belts to stop and also direct the cushion making machine to stop cushion manufacturing. An operator can then remove the rejected cushions from the system and correct problems that may be responsible for the production of under-filled cushions.

In some embodiments, the system may also include a conveyor that is adapted for transporting strings of packaging cushions to one or more packaging stations. The conveyor may include one or movable conveyor sections that can be moved to provide cushion flow paths to various packaging stations. In some embodiments, the conveyor includes a plurality of conveyor belts for transporting the cushions. In other embodiments, the conveyor comprises a plurality of air ducts and blowers that are adapted for transporting strings of packaging cushions. In some embodiments, the conveyor is also operatively connected to a controller that can be used to direct strings of packaging cushions to the packaging stations as needed. The conveyor may also include a separator that can be used to separate the strings of packaging cushions into smaller segments for delivery to the packaging stations. The separator may also be used to separate properly inflated cushions from under-filled cushions. The separator may also be operated by the controller.

Thus, the invention provides an apparatus and system that can be used to detect strings of under-filled cushions and help prevent the production and conveyance of under-filled cushions.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6 is a perspective view of a system for conveying a string of packaging cushions in connection with the under-filled cushion detector of the invention;

FIG. 7 is a fragmentary sectional side view of the system of FIG. 6 depicting an intermediate outlet in the closed position;

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1A:
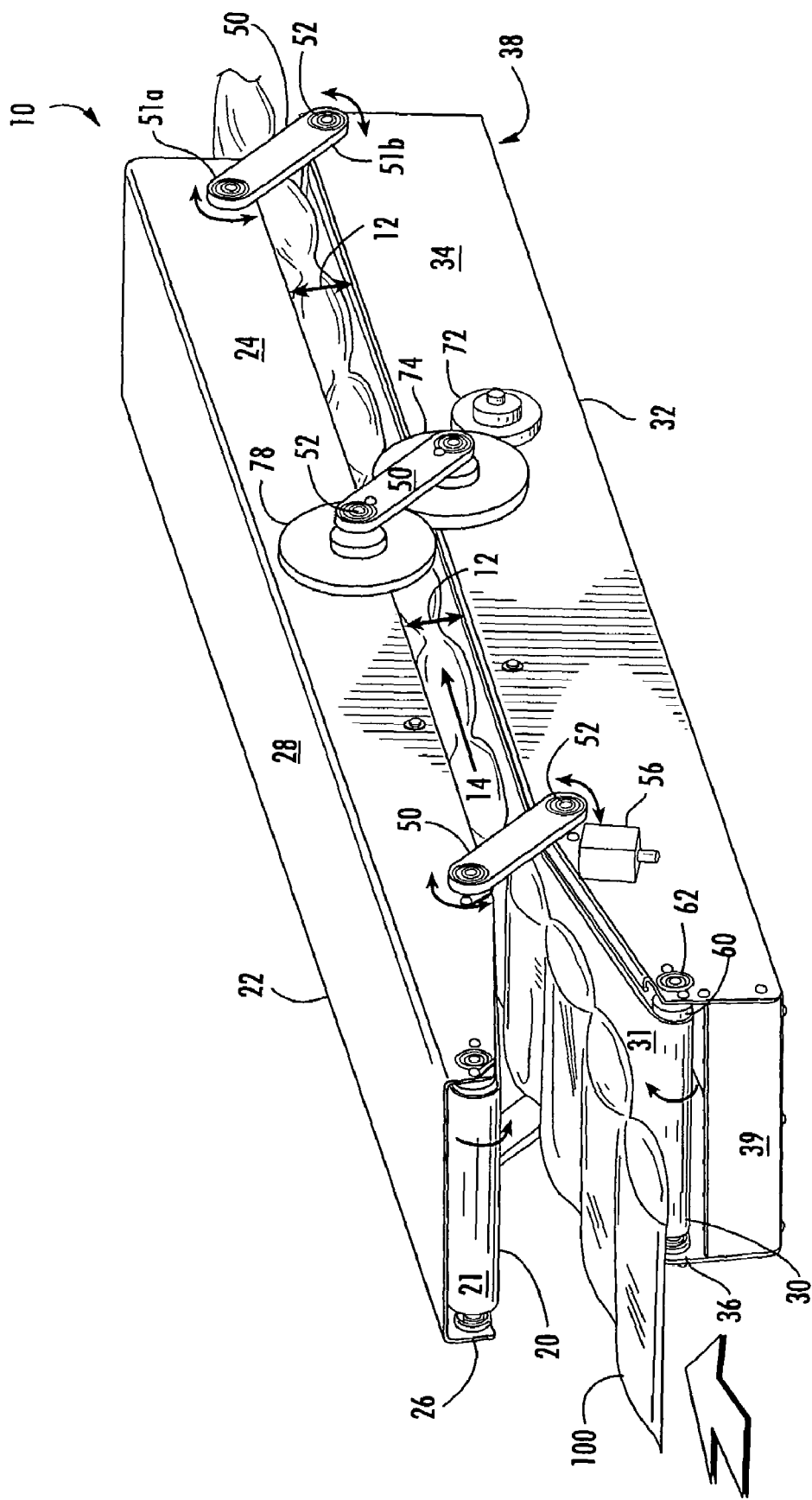
FIG. 1A is a perspective view of an under-filled cushion detector depicting a string of packaging cushions passing between a pair of endless moving belts.

With reference to FIGS. 1A through 4, an apparatus capable of detecting under-filled packaging cushions is illustrated and broadly designated as reference number 10. The "under-filled cushion detector" comprises a pair of endless belts disposed one above the other and wherein the upper driven belt 20 movably suspended above the lower driven belt 30. The upper belt 20 and lower belt 30 cooperate to define a longitudinal cushion pathway 14 between the belts 20, 30. At least one of the belts is driven so that a string of cushions passing in between the belts may be driven in a desired direction. As shown in FIG. 1A, a string of packaging cushions 100 is depicted traveling along the cushion pathway 14 between the upper and lower belt. The height 12 of the cushion pathway, i.e., the distance between the upper and lower belts, is variable depending upon the thickness of the string of packaging cushions. As a result, if a string of under-filled or deflated packaging cushions travels into the cushion pathway 14, the upper belt 20 will move downwardly in the direction of the lower belt (see FIG. 2). The under-filled cushion detector 10 may comprise a detector 56, for detecting whether the height 12 of the cushion pathway has decreased below a predetermined minimum value. The detector 56 may comprise a switch (not visible in the drawings) that is activated when height 12 is below a minimum value. The detector may also be adapted to stop the forward movement of the belts if the distance has decreased below the minimum value. For example, the detector can instruct a motor or control unit to stop forward motion of the belts if the height decreases below a minimum value. In some embodiments, the detector can activate a brake that is adapted for stopping the forward movement of the belts.

Figure 5:
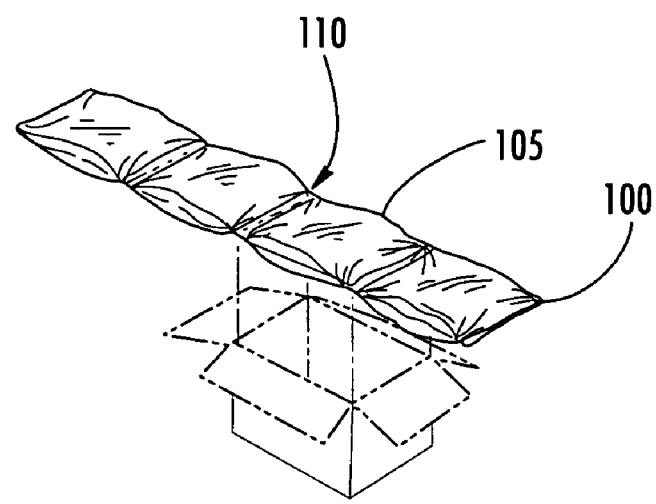
FIG. 5 is a perspective view of a string of packaging cushions dispensed for placement in a shipping container.

The under-filled cushion detector may be used with a variety of different types of packaging cushions including, but not limited to, air-filled cushions, foam-filled cushions, and cushions comprising other types of packaging materials. The under-filled cushion detector is particularly useful for detecting and preventing the conveyance of under-inflated packaging cushions. As shown in FIG. 5, the packaging cushions may be in the form of a continuous string of packaging cushions 100 comprising individual cushions 105 that may include a line of weakening, such as a perforation 110 between each adjacent cushion 105. The line of weakening helps facilitate separation of the string into string segments or into one or more individual cushions. The under-filled cushion detector may be used to help prevent the transport of strings of under-filled cushions and strings of cushions that have a thickness that is less than a desired minimum value.

Preferably, both the upper belt 20 and the lower belt 30 are driven and oriented in a face-to-face arrangement so that the surface of the belts cooperate together to form a nip to transport the string of packaging cushions 100 in a desired direction. A "nip" as used herein may be considered as the space between the counter-rotating belts where the incoming strings of packaging cushions may be drawn between the belts. In some embodiments, the upper belt and lower belt comprise conveyor belts that are adapted to grip and propel the string of packaging cushions. As shown in FIG. 1A, the upper and lower belts may each comprise a single endless belt, or may each comprise a plurality of endless belts (see FIG. 2) that may be driven about a plurality of rollers 60. The dimensions of the belt, such as width and length may be varied depending upon numerous factors such as the size of the packaging cushions, facility space limitations, the desired minimum length of the string segment of under-filled cushions to be detected, and the like. For example, the length of the upper belt may be varied to detect string segments of under-filled cushions having a minimum number of under-filled packaging cushions. Typically, the detector should be capable of stopping the belts if the 6 or more under-filled cushions are prepared in sequence, and somewhat more typically, if 4 or more under-filled cushions are prepared in sequence The surface of the upper belt 21 and lower belt 31 may comprise one or more materials that enhance the tackiness or friction between the string of packaging cushions and the belts to assist the transport of the string of packaging cushions that may rest on the upper and lower belts. Such materials include, but are not limited to, rubber and other elastomers, polymeric plastics, cork, and the like. The surface of the belt may be formed by a coating of such materials. An exemplary belt material is Tigon tubing. It should be recognized that a variety of different materials can be used for the surface of the upper and lower belts provided that the surface can grip and drive the cushions forward without causing damage to the cushions.

Figure 2:
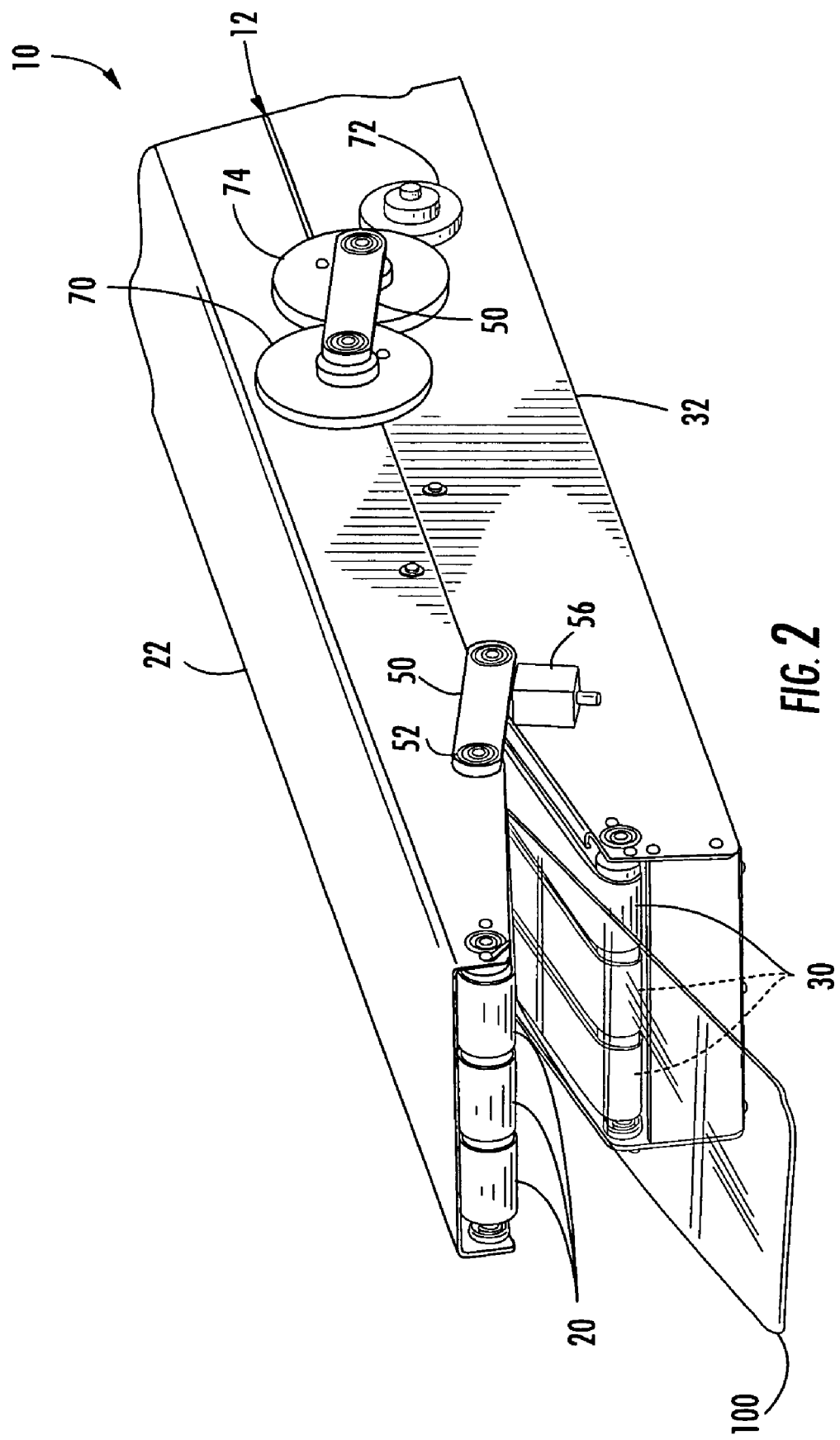
FIG. 2 is a perspective view of an under-filled cushion detector depicting a string of under-filled packaging cushions disposed between the pair of belts illustrated in FIG. 1A.

Preferably, the upper belt 20 is movably suspended above the lower belt 30 so that as a string of packaging cushions travels between the belts, the distance between the belts can be easily decreased or increased depending upon the thickness of the cushions. In essence, the upper belt should be able to "float" above the lower belt so that the upper belt can freely move towards or away from the lower belt with minimal resistance. As a result, the distance between the upper and lower belts is "self-adjusting" so that the height of the cushion pathway may vary depending upon the thickness of the string of packaging cushions. For example, the upper belt moves downwardly in the direction of the lower belt in response to a string of under-filled or less inflated packaging cushions traveling between the belts. Likewise, if a string of packaging cushions having a greater thickness enters the cushion pathway, the upper belt should move upwardly away from the lower belt and thereby increase the height 12 of the cushion pathway. In this regard, FIGS. 1A and 2 illustrate an upper belt that has moved between an open or run position to a closed or shut-off position in response to a string of under-filled packaging cushions traveling between the belts.

In one embodiment, depicted in FIGS. 1A through 4, the under-filled cushion detector 10 comprises an upper housing member 22 and a lower housing member 32 that are adapted for supporting and containing the driven belts 20, 30 therein. In some embodiments the upper housing member 22 comprises sidewalls 24, 26 and top wall 28 that are joined together to define a supportive housing for the upper belt 20. Similarly, lower housing member 32 may also comprise sidewalls 34, 36 and bottom wall 38 that are joined together to define a supportive housing for the lower belt 30. The housing members may provide protection and support for the upper and lower belts and miscellaneous components that may be associated with the operation of the belts. Typically, the walls of the housing members comprise a strong and lightweight material such as aluminum, stainless steel, and the like. In some embodiments, the lower housing member 32 may also include a front wall 39 and back wall (not illustrated).

Figure 3:
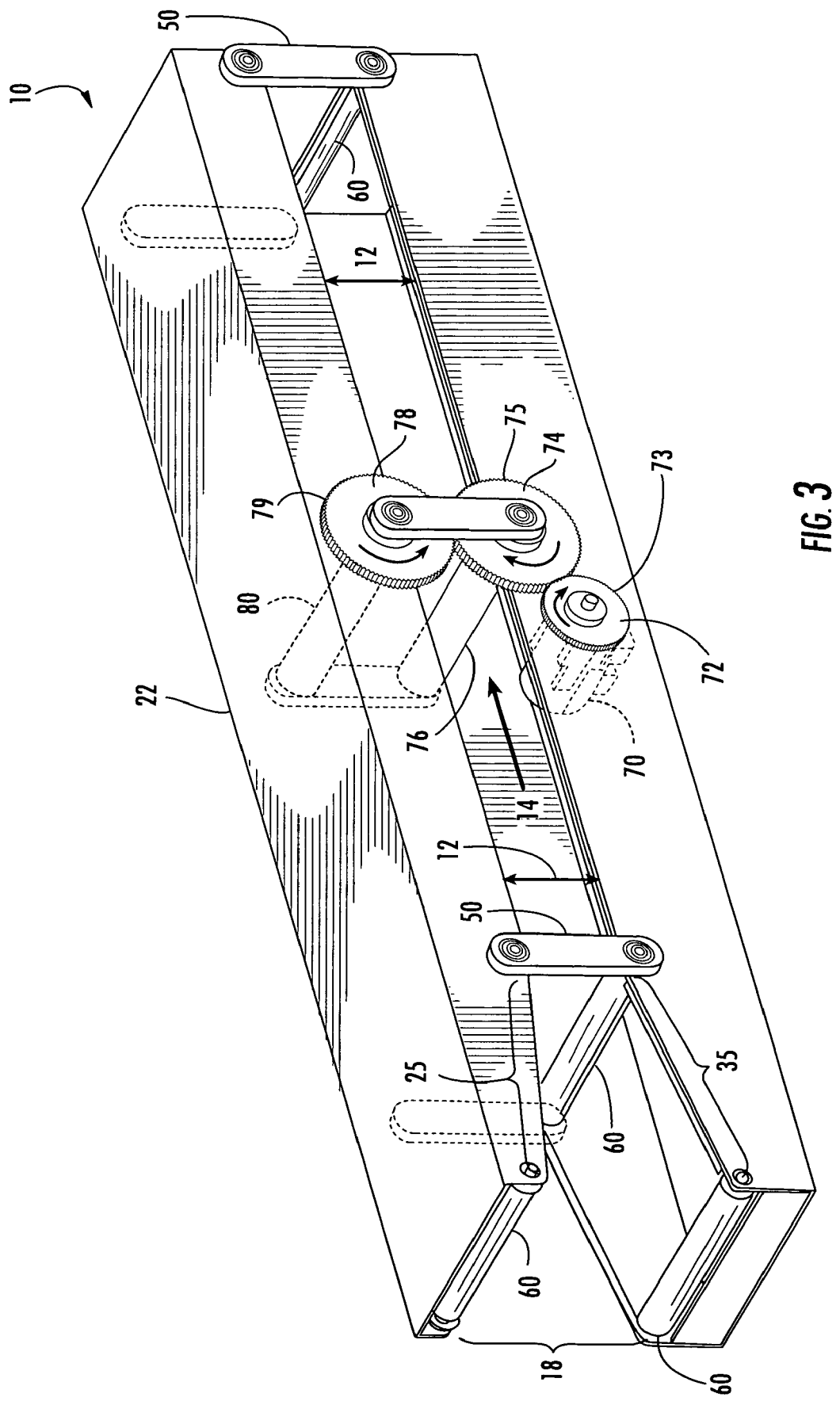
FIG. 3 is a perspective view of an under-filled cushion detector depicting a motor assembly for driving the belts.

In some embodiments, the under-filled cushion detector may also comprise an opening that is adapted for receiving a string of packaging cushions. As shown in FIG. 3, opening 18 comprises a portion of the cushion pathway wherein the distance between the upper and lower housing member is greater than height 12 of cushion pathway 14. The upper and lower belts in the opening 18 may provide an angled surface, as shown generally at 25 and 35. When a string of packaging cushions enters into the opening 18, the upper and lower belts will grip the packaging cushions and drive them forward. As a result, as the cushion first enters between the belts 20, 30 and proceeds into the narrowed portion of the opening 18, the cushion will push upwardly on the upper belt causing it to move upwardly away from the lower belt creating a cushion pathway having a height 12 that is determined by the thickness of the string of packaging cushions.

The under-filled cushion detector also includes a means for movably suspending the upper belt 20 above the lower belt 30. As discussed above, the upper belt 20 preferably "floats" above the lower belt 30 so that the upper belt can move with minimal resistance towards or away from the lower belt. In one embodiment, the means for movably suspending the upper belt comprises a plurality of support members that are pivotably attached to the upper housing member at one end, and to the lower housing member at the other end. As shown in FIG. 1A, the under-filled cushion detector 10 may include a plurality of support members 50 having a proximal end 51a pivotably attached to the upper housing member 22, and a distal end 51b pivotably attached to the lower housing member 32. Typically, the distal and proximal ends of the support members each pivot about an axis of rotation that is substantially perpendicular to machine direction of the upper and lower belts. In this regard, FIG. 1A depicts small semi-spherical arrows representing the rotation of the support members.

In some embodiments, each support member may pivot substantially in unison as strings of packaging cushions of varying thickness are transported between the upper and lower belts. In some embodiments, the support members 50 may be pivotably attached directly to the housing members, or as shown in FIG. 3, a pair of support members 50 may be attached to opposite ends of a roller 60. The under-filled cushion detector 10 may comprise multiple rollers 60 that are adapted for supporting and/or driving the upper and lower belts.

The placement and quantity of support member can be varied depending upon several factors such as the overall length and weight of the apparatus, the relative ease with which the support members are free to pivot about their axes of rotation, and the like. Typically, the under-filled cushion detector may comprise about 4 to 8 support members. The support members typically comprise a strong, rigid material such as aluminum, thermoplastic, steel, and the like.

The upper belt can be movably suspended above the lower belt using other methods including, but not limited to a system using a plurality of "rod-less" air pistons, gas cylinders, a carriage suspended from the ceiling or an overhead support, and the like. It should be recognized that a variety of different methods can be used to movably suspend the upper belt above the lower belt provided that the upper belt is able to move freely with minimal resistance to accommodate strings of packaging cushions of varying size and to detect under-filled cushions.

Figure 1B:
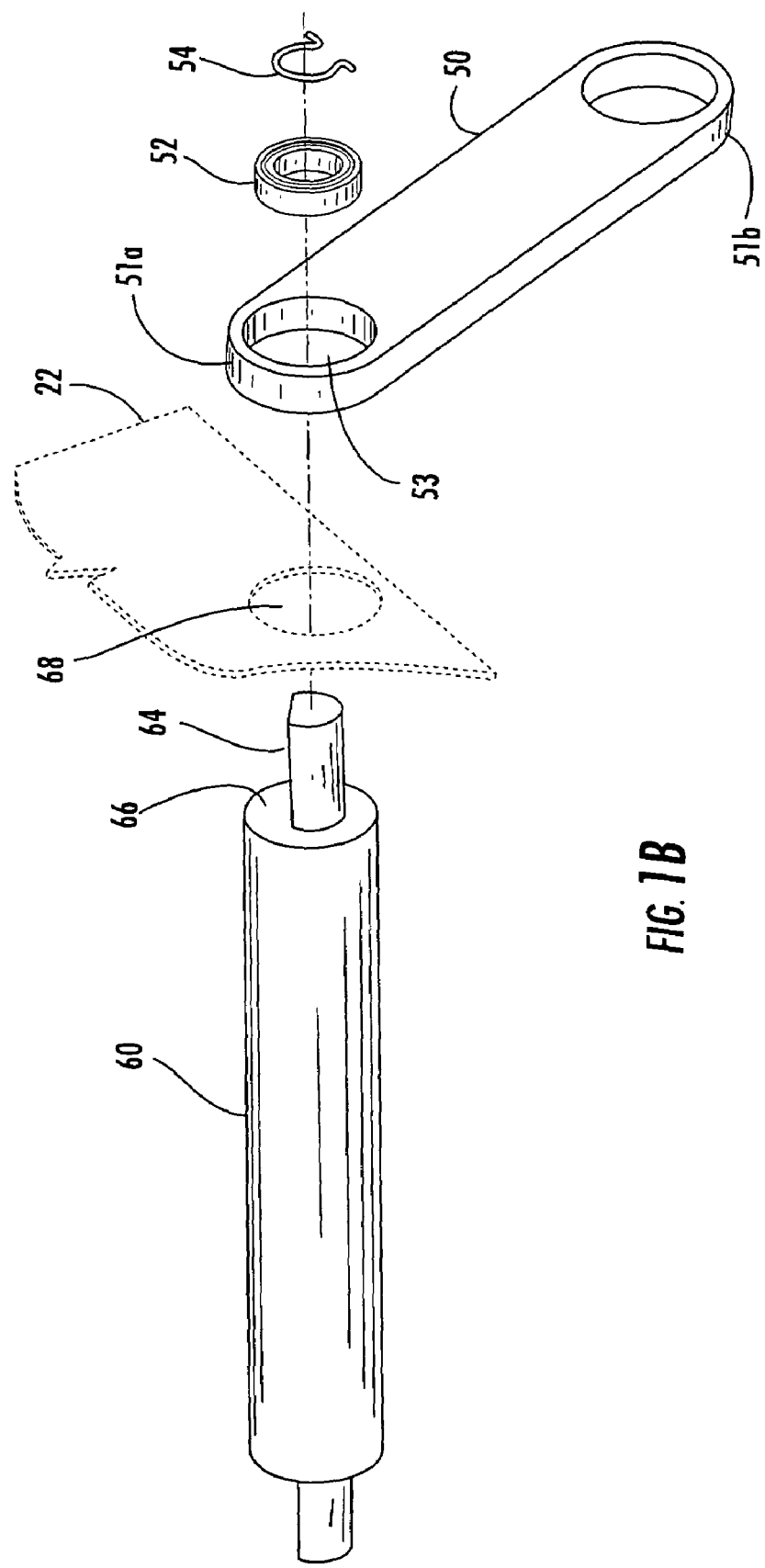
FIG. 1B is an exploded view of a support member shown in FIG. 1A that is used to support one belt above the other at a distance that is variable in response to cushion thickness.

With reference to FIG. 1B, an exploded perspective of the attachment of support member 50 to roller 60 is illustrated. The proximal and distal ends 51a, 51b of the support members 50 each include a channel 53 adapted for receiving a friction reducing member 52, such as a bearing. Bearing 52 is rotatably disposed in channel 53. Roller 60 in some embodiments may comprise a tubular roller body 66 that is adapted for contacting an inner surface of the belts. A central shaft 64 may extend laterally through the tubular roller body 66 and extend through opening 68 formed in the sidewall 24 of the housing member. Support member 50 and bearing 52 slidingly attach to the portion of shaft 64 that extends through opening 68. A retaining means, such as retaining rings 54 or other clamping devices, may be used to positionally secure and attach the support member and bearing onto shaft 64. Suitable retaining means include, without limitation, spring clip, set screw, pins, screws, male/female key, bolts, and the like. In some embodiments the shaft may be fixed to the housing member and include idler bearings that allow the tubular roller body to rotate about the shaft. In other embodiments, the tubular roller body may be fixedly attached to the shaft so that rotation of the shaft also rotates the roller body, and rotation of the roller body also rotates the shaft.

The friction reducing members 53 may be selected from a variety of different mechanisms that allow the support members to rotate with minimal resistance about the shaft. Typically, the friction reducing member comprises a bearing such as a roller bearing including needle bearings, ball bearings, and the like. The bearings may comprise a wide variety of materials including, but not limited to stainless steel, ceramic, aluminum, plastic, metallic alloys such as bronze, and the like. It should be recognized that other materials such as packed grease, for example, could be used to facilitate rotation of the support member about the shaft, although not necessarily with equivalent results.

Typically, the upper belt 20 and the lower belt 30 are in mechanical communication and rotatably driven by a motor assembly. As shown in FIG. 3, the motor assembly in some embodiments comprises a motor 70 having motor gear 72. The motor gear 72 may comprise a plurality of gear teeth 73 that drivingly intermesh with gear teeth 75 disposed about the circumference of lower gear 74. Lower gear 74 is typically in mechanical communication with roller 76. Gear teeth 75 also drivingly intermesh with gear teeth 79 that are disposed about the circumference of upper gear 78. Upper gear 78 is typically in mechanical communication with roller 80. Roller 76 is in mechanical communication with the lower belt, and roller 80 is in mechanical communication with the upper belt. Rotation of motor gear 72 also rotates both lower gear 74 and upper gear 78, which results in driving upper belt and lower belt in a desired direction. In some embodiments, as shown in FIG. 3, rollers 76 and 80 may both include a central shaft that extends through the upper gear 78 and lower gear 74. The shaft may then be secured to the support member in a similar fashion to that described above.

It should be recognized that the belts could be driven using other mechanisms, which include by way of example and not limitation, sprocket and chain drives; gear drives, timing gears and chains, pulleys and belts, additional motors, and the like. In some embodiments, separate motors may be used to separately drive the upper belt and lower belt.

As discussed above, the under-filled cushion detector may also comprises multiple rollers 60 that are adapted for supporting the belts as they are driven about the housing member. With reference to the lower housing member 32 depicted in FIG. 1, roller 60 may extend laterally between the opposing sidewalls 34, 36. In some embodiments, the housing member may include openings 68 (see FIG. 1B) for receiving friction reducing members 52 or 62, and shaft 64.

The under-filled cushion detector also comprises a detector adapted to determine whether the height of the cushion pathway has decreased below a minimum value. As shown in FIGS. 1 and 2, the detector 56 may comprise a switch (not visible) that can be activated by support member 50 as it pivots downwardly and contacts the detector 56. In this regard, FIG. 2 illustrates a string of deflated or under-filled cushions sandwiched between the upper and lower belts. As a result, support member 50 has pivoted downwardly and contacted the switch. In some embodiments, the detector 56 can both detect the distance between the belts, and send a signal that directs an operator or the motor to stop driving the belts. In other embodiments, a detector 56 may send the signal to a separate device such as controller that can then instruct the motor to stop movement of the belts. The detector 56 may comprise other mechanisms and configurations for determining the distance between the upper and lower belts. For example, the detector may comprise a plunger rod connected to the upper and lower housings. In other embodiments the detector 56 may comprise an electronic distance measurer (EDM). EDMs typically measure distances by transmitting waves of energy, such as ultrasonic, laser, infrared, etc., which are reflected by a surface back to the EDM.

The under-filled cushion detector may help prevent under-filled cushions from being transported to packaging stations. Additionally, in some embodiments, the detector may in communication with the cushion making machine, and may be adapted to signal the machine to stop producing packaging cushions. As a result, it may be possible to help prevent the packaging machine from continuing to produce under-filled or deflated cushions.

In some embodiments, switch 56 may be in direct communication with the motor and may shut-off the motor in the event the switch is tripped. In an alternative embodiment, the detecto may be in communication with a controller, such as a programmable logic controller, that may be in communication and operatively connected to the motor. In some embodiments, the detector may be selectively positioned so that a string segment of packaging cushions having a thickness below a preselected minimum value activates the detector to stop the production of cushions. As a result, the detector may be selectively adjusted to transport only cushions above a desired thickness value.

The detector 56 may comprise one or more of the following devices to determine the distance between the upper and lower belts and whether the distance is below a desired value (indicating the string segment of cushions is below a desired height): a contact-activated switch such as a limit or rocker switch, photo-eye detector, electric-eye, infrared detector, laser detector, and the like.

Figure 4:
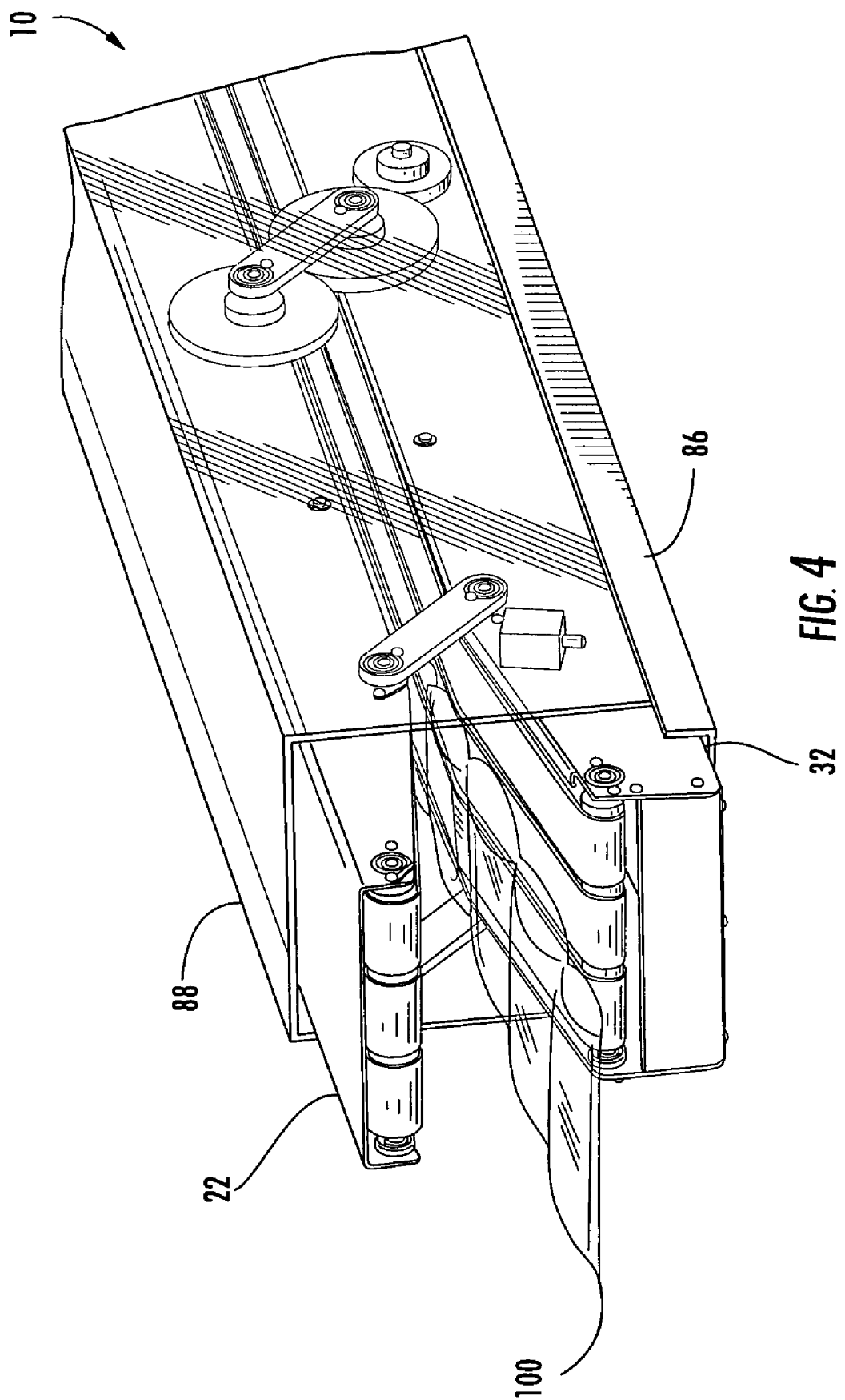
FIG. 4 is a perspective view of an under-filled cushion detector having a protective casing.

In some embodiments, the under-filled cushion detector 10 may also comprise a protective casing that encloses both the upper and lower housing members. As shown in FIG. 4, protective casing 88 covers the top and sides of the under-filled cushion detector. The protective casing typically comprises a rigid, transparent plastic material, such as Lexan®, that is both strong and lightweight. The under-filled cushion detector may also include supports, such as angle brackets 86, that are adapted for supporting and securing the protective casing. The angle brackets 86 may be attached to opposite sides of the lower housing member. Angle brackets extending along the length of the lower housing member may be particularly useful because they can also be used to provide a protective housing in which miscellaneous control lines and conduits can be disposed.

The under-filled cushion detector 10 may be adeptly suited for use in conjunction with a system for producing and conveying strings of packaging cushions. Exemplary systems are described in U.S. patent application Ser. Nos. 10/780,176 and 10/661,235, the contents of which are incorporated in their entirety.

With reference to FIGS. 6 and 7, an exemplary cushion packaging system 200 comprising an under-filled cushion detector is illustrated. As shown, the system may comprise one or more cushion supply machines 210, under-filled cushion detector 10, separator 240, conveyor 220, controller 250, and hoppers 230.

The cushion supply machine 210 makes strings of packaging cushions that are to be supplied to one or more packaging stations 235. The newly formed packaging cushions are fed into the mouth of the under-filled cushion detector 10 where the upper and lower belts grip the string and transport the cushions in a desired direction. In some embodiments, the string of packaging cushions may be transported to a single packaging station, or as shown in FIG. 7, the strings may be transported to a conveyance system that can be used to feed multiple packaging stations.

In some embodiments, the system may comprise a controller 250 that is operatively connected to various sensors and components. The controller in some embodiments is adapted to control and direct the operation of the system. In the event the switch on the under-filled cushion detector 10 is activated, the controller can direct the upper and lower belts 20, 30 (see FIG. 1) to stop. The controller may also direct the cushion supply machine to shut-off to prevent the production of defective cushions. An operator can then proceed to correct any conditions that may have resulted in the production of under-filled cushions. As a result, the under-filled cushion detector may help reduce the production of defective packaging cushions.

In some embodiments, the controller may also be operatively connected to a separator 240 that is adapted to facilitate the separation of the under-filled cushions from acceptable cushions that may already be present in the conveyance system. Once the upper and lower belts have been shut-off, an operator may remove the defective cushions from the system.

The controller in some embodiments may also direct the separation and transport of segments of packaging cushions to a desired packaging station as needed. In this embodiment, which is discussed in greater detail below, the controller is operatively connected to sensors that measure the amount of packaging cushions available at each packaging station. If the packaging cushion supply level at a station decreases below a minimum value, the controller can direct the conveyance system to transport strings of packaging cushions to the packaging station via a series of moveable conveyor sections that create cushion flow paths to a desired location.

After passing through the under-filled cushion detector, strings of packaging cushions having acceptable thickness may be transported to a packaging station via a conveyor 220 also referred to as a conveyance system. As shown in FIGS. 6 and 7, the conveyance system in some embodiments may comprise a series of conveyor belts 224. In some embodiments, the conveyor may comprise one or more air ducts that are adapted to transport the strings of packaging cushions to one or more packaging stations 235 via blown air. As shown, the conveyance system defines a cushion passageway 228 and may comprise an inlet end 221 which is capable of receiving and passing the string of packaging cushions into the conveyor passageway 228, and an outlet end 222 and one or more intermediate outlets 223 that feed the packaging cushion segments into hoppers 230. One or more moveable conveyor sections 225, 226, 227 may be disposed between the intermediate outlets 223 and between outlet end 222 and an intermediate outlet. The moveable conveyor sections define packaging cushion passageways through which the packaging cushions may be transported to individual hoppers as needed. The hoppers 230 are adapted to store multiple segments of packaging cushions for easy access by a packaging operator at a packaging station 235.

As shown in FIGS. 6 and 7, the conveyance system 220 may be elevated with respect to the cushion making machine 210 and the packaging stations 235. In embodiments comprising an elevated conveyance system, the under-filled cushion detector 10 may be used to convey the string of packaging cushions from the cushion making machine to the inlet 221 of the conveyance system. In some embodiments, the under-filled cushion detector 10 may be supported by frame 217. In other embodiments, the upper and lower housing members may be structured to adapt to the inlet 221 of the conveyance system. In this regard, FIG. 7 illustrates the under-filled cushion detector 10 having a back wall that is angled at 37 so that the detector 10 may be easily attached or joined to the conveyance system.

As discussed above, the system 200 may also comprise a separator 240 or plunger that is adapted to separate the string of packaging cushions into desired lengths or segments. In some embodiments, the separator 240 is in communication and controlled by controller 250. The separator 240 in some embodiments comprises a separator bar 242, which may be driven by an actuator 244. The separator may be moveable between a disengaged position where the separator bar is disposed above the strings of packaging cushions, and an engaged position where the separator bar moves downwardly and contacts a cushion so that the contacted cushion's forward travel is temporarily stopped. As a result, the cushion may be separated from the preceding string of packaging cushions because conveyor belt 224 continues to drive the string of cushions forward causing the contacted cushion to separate at the perforation. Preferably, the separator bar comprises a narrow bar that contacts a cushion along a side edge and does not contact a majority of the surface area of the cushion. In other embodiments, a knife or cutting mechanism may be used to separate the cushions.

The separator 240 can also help facilitate separation of under-filled packaging cushions from properly inflated cushions that are in the conveyance system. If a string of under-filled packaging cushions is detected in the under-filled cushion detector, the upper and lower belts may be stopped. The controller 250 can instruct the separator 240 to engage a cushion so the remaining properly inflated portion of the string may be separated from the defective packaging cushions. An operator can then remove the under-filled or defective cushions from the system.

Figure 8:
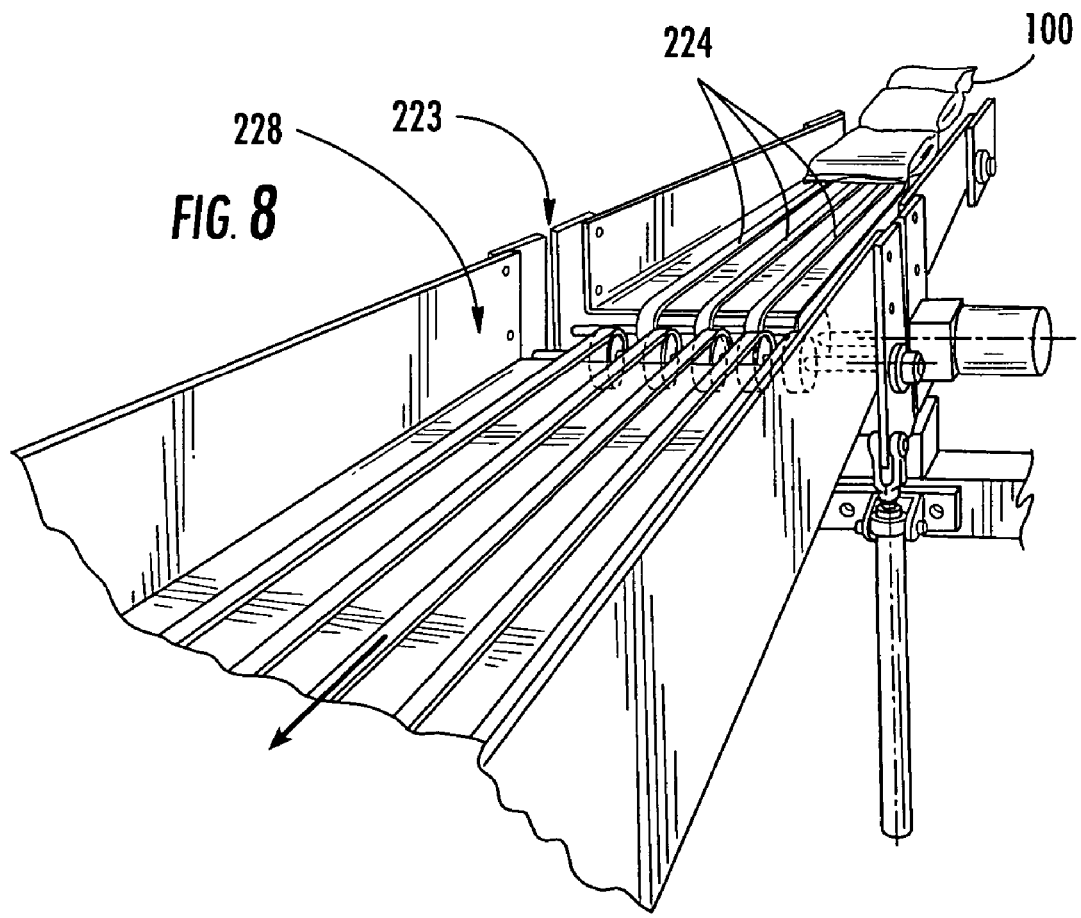
FIG. 8 is a fragmentary perspective view of the system of FIG. 6 depicting an intermediate outlet in the closed position.
Figure 9:
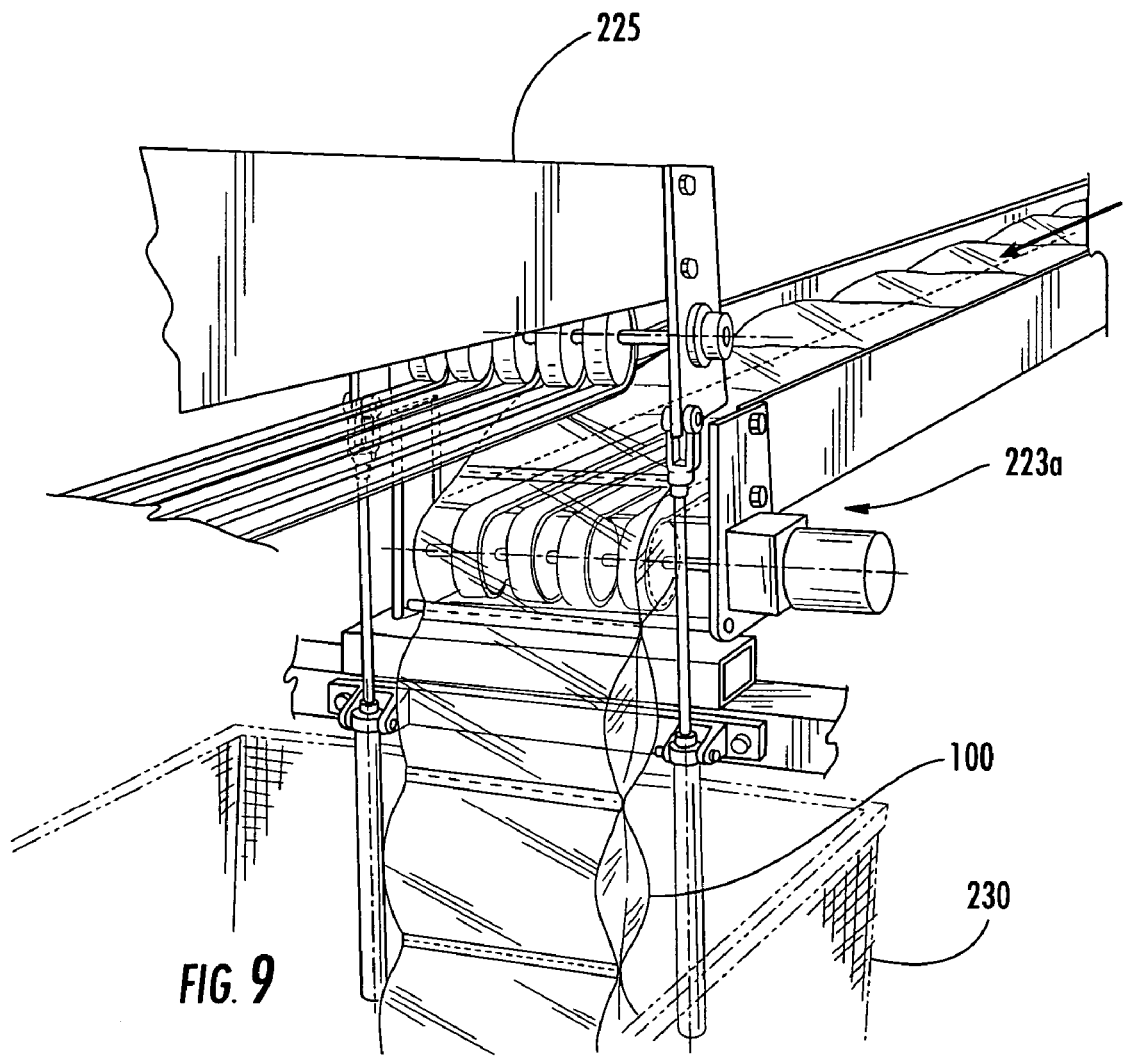
FIG. 9 is a fragmentary perspective view of the system of FIG. 6 depicting an intermediate outlet in the open position.

After a segment of packaging cushions has been separated, the segment may be transported through a conveyor section to a desired hopper. Conveyor sections may be moveable to form intermediate outlets 223. A moveable conveyor section may be moveable between a conveyor-section closed (in-line) position (see FIG. 8), in which the string of packaging cushions passes the corresponding intermediate outlet 223 in the closed position, and a conveyor-section open position (FIG. 9), which creates a corresponding open intermediate outlet 223a. The string of packaging cushions can then pass through the open intermediate outlet and into a hopper 230. In some embodiments, the movement of the conveyor sections may be operatively controlled by controller 250 that can direct the conveyance system to transport desired lengths of packaging cushion segments to a particular hopper 230.

One or more hoppers 230 may correspond to the outlet end 222 and each of the intermediate outlets 223 of the conveyance system 220. The hoppers are adapted to store strings of packaging cushions 100. Hoppers 230 may be located below the conveyance system 220 and may be elevated above a packaging station 235, for example, elevated to about shoulder height to facilitate access. The hoppers or bins 230 may comprise a mesh basket to hold the cushions 100. Hoppers 230 may also comprise one or more openings 232 through which a packing operator may withdraw at least a portion of the string of packaging cushions. In some embodiments, the hopper may include one or more sensors or switches for monitoring the supply of cushions stored in the hopper. The sensor may be in communication with controller 250. In the event that the hopper supply decreases below a minimum value, the controller can direct the conveyance system to transport a new supply of cushions to the hopper.

The cushion supply machine 210 is capable of manufacturing and/or supplying a string of packaging cushions 100. Either each cushion 105 or the string of packaging cushions may be connected to at least one other adjoining cushion of the string. The string of packaging cushions 100 may include perforations 110 (see FIG. 5) between adjacent cushions 105 of the string to facilitate separation of the string into string segments or into one or more individual cushions. "Perforations" as used herein includes scoring, lines of weakening, or any other structure or configuration adapted to facilitate the selective separation of the string of packaging cushions. The string of packaging cushions may comprise air-filled cushions, foam filled cushions, as well as cushions comprising other types of packaging materials. Such packaging cushions may be useful in or adapted for packaging applications. An exemplary string of air-filled cushions is sold under the Fill-Air 1000® trademark by Sealed Air Corporation.

In some embodiments, the cushion supply machine 210 is in communication and operatively controlled by controller 250. The packaging cushion machine may also include an upper sensor 271 and lower sensor 273 for detecting if the conveyance system is operating faster or slower than the packaging machine. The upper and lower sensors 271, 273 may send a status signal to controller 250, which may use that information to control one or more of: the rotational speed of the upper and lower belts 20, 30 (see FIGS. 1 and 2) the manufacturing speed or on/off cycle of cushion supply machine 210.

As discussed above, the system 200 may also comprise a controller 250 that is adapted for controlling the operations of the system, including the operation of the under-filled cushion detector 10. The controller 250 may receive and send the various status, activation, and control signals described below. Input/output connections and signal transmission lines between the controller 250 and the various sensors and devices that are operatively connected to the controller are not shown and are considered to be within the ordinary skill of the art. In some embodiments, the controller can operate the cushion supply machine, conveyor, separator, and under-filled cushion detector in a coordinated sequence to facilitate the manufacture, conveyance, and separation of the strings of packaging cushions.

The controller 250 may comprise a programmable logic controller ("PLC"). The controller 250 may comprise one or more of a: 1) central processing unit ("CPU"), for example, comprising a microprocessor, to control the functions and operations of the controller, 2) memory storage including read only memory ("ROM"), random access memory ("RAM"), for example, 3) multiple input/output interfaces for receiving and sending signals, and other storage, display, and peripheral devices as known in the art. The controller 250 may also store and execute software control program code for carrying out the various control and monitoring functions described herein.

In some embodiments, the system 200 may also comprise one or more sensors adapted to detect the presence or absence of an object, such as a string of packaging cushions, and send a corresponding status signal to controller 250. A sensor may comprise, for example, one or more of a photo-eye, an electric-eye, photo-detector, and a corresponding reflector.

In other embodiments, the conveyance system may comprise one or more air ducts through which the string of packaging cushions may be propelled by air conveyance. For example, an air conveyance duct adapted to cooperate with one or more blowers to establish a propelling flow of air through the duct may be used in the conveyance system instead of or in conjunction with conveyor 224. Such an air conveyance duct may comprise multiple outlets for the string segments of the packaging cushions. Air-conveyance ducts and systems useful for the air-conveyance of a string of packaging cushions are described in commonly owned U.S. patent application Ser. No. 10/661,231, filed Sep. 12, 2003, and in U.S. Pat. Nos. 6,519,916 and 6,453,644, which are hereby incorporated by reference.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for detecting under-filled packaging cushions comprising:
a pair of endless belts disposed one above the other to define a longitudinal pathway having a height through which packaging cushions are conveyed, wherein at least one of said belts is driven in a forward direction to convey said packaging cushions along said longitudinal pathway and wherein the upper belt is movably suspended above the lower belt in response to the thickness of packaging cushions traveling therebetween; and a detector adapted to detect the height of said longitudinal pathway a predetermined minimum distance between said belts and stop the movement of said at least one driven belt in the forward direction in response to detection of the said height of said longitudinal pathway if said height is at or below a predetermined minimum height.

2. An apparatus according to claim 1, wherein said upper belt moves in the direction of the lower belt if a string of under-filled packaging cushions is disposed between said upper and lower belts.

3. An apparatus according to claim 1, wherein said upper belt and said lower belt are driven in said forward direction.

4. An apparatus according to claim 1, wherein said upper belt comprises a plurality of conveyor belts and said lower belt comprises a plurality of conveyor belts.

5. An apparatus according to claim 1, wherein said detector comprises a contact switch.

6. An apparatus according to claim 1, wherein said detector comprises a photo-eye detector, electric-eye, ultrasonic detector, infrared detector, or laser detector.

7. An apparatus according to claim 1, further comprising a controller in communication with said detector, and wherein said controller is operatively connected to said upper and lower belts whereby said controller stops said at least one driven belt in response to a signal from the detector if a string of under-filled packaging cushions is detected between said upper and lower belts.

8. An apparatus according to claim 1, wherein said upper belt is disposed in an upper housing member, and said lower belt is disposed in a lower housing member.

9. An apparatus according to claim 8, further comprising a plurality of support members adapted for movably suspending said upper housing member above said lower housing member, said support members each having a proximal end pivotably attached to said upper housing member, and a distal end pivotably attached to said lower housing member, and wherein said distal and proximal ends each pivot about an axis of rotation that is substantially perpendicular to said longitudinal pathway.

10. An apparatus according to claim 9, wherein said support members pivot between a run position adapted for conveying a string of packaging cushions, and a shut-off position adapted for preventing the conveyance of a string of under-filled packaging cushions.

11. An apparatus according to claim 10, wherein said detector comprises a limit switch, and wherein at least one of said support members in the shut-off position is adapted for contact with said switch, whereby said contact activates said switch to stop forward movement of said belts.

12. An apparatus according to claim 9, wherein said proximal and distal ends of the support members each include a channel adapted for receiving a bearing, and a bearing rotatably disposed therein.

13. An apparatus according to claim 1, wherein the length of the upper belt is at least as long as four packaging cushions.

14. An apparatus according to claim 13, wherein said upper belt is configured and arranged to move in toward said lower belt if a string of four or more under-filled packaging cushions is disposed between said upper and lower belts.

15. An apparatus according to claim 1, further comprising a plurality of support members adapted for movably suspending said upper belt above said lower belt, said support members each having a proximal end pivotably attached to said upper belt, and a distal end pivotably attached to said lower belt, and wherein said distal and proximal ends each are configured to pivot in unison about an axis of rotation that is substantially perpendicular to said longitudinal pathway in response to the thickness of a string of packaging cushions disposed between said upper and lower belts.

16. A device for detecting under-filled cushions comprising:
a pair of housing members disposed one on top of the other to define a longitudinal pathway having a height through which packaging cushions are conveyed, each housing member having an endless belt disposed therein;
a plurality of support members adapted for movably suspending the upper housing member above the lower housing member, said plurality of support members each having a proximal end pivotably attached to the upper housing member, and a distal end pivotably attached to the lower housing member, wherein said distal and proximal ends each pivot about an axis of rotation that is substantially perpendicular to said longitudinal pathway in response to the thickness of packaging cushions traveling between said upper and lower housing members;
a motor assembly adapted for driving at least one of said belts in a forward direction; to convey said packaging cushions along said longitudinal pathway
a detector adapted to detect the height of said longitudinal pathway a and stop the movement of said belts in the forward direction in response to detection of said height of said longitudinal pathway if said height is at or below a predetermined minimum height.

17. The device according to claim 16, wherein at least one of said support members is adapted to contact said detector in response to said height of said longitudinal pathway decreasing below said predetermined minimum height whereby said contact activates said detector to stop movement of said belts.

18. The device according to claim 17, wherein said detector comprises a limit switch.

19. The device according to claim 16, wherein each housing member includes a plurality of rollers adapted for supporting said upper and lower belts.

20. The device according to claim 16, wherein said motor assembly comprises a series of gears, belt and pulley, chain and sprocket, or combinations thereof.

21. The device according to claim 16, further comprising a protective casing disposed about said upper and lower belts.

22. A method of detecting under-filled packaging cushions comprising:
a. passing a string of packaging cushions between an upper belt that is moveably suspended above a lower belt, such that said upper belt and said lower belt define a longitudinal pathway having a height wherein said at least one of said belts is driven in a forward direction; to convey and string of packaging cushions along said longitudinal pathway
b. moving the upper belt toward or away from the lower belt in response to the thickness of the string of packaging cushions; detecting the height of said longitudinal pathway as the string of packaging cushions passes between the belts and c. stopping the movement of said upper and lower belts in the forward direction if the distance between the upper driven belt and the lower driven belt decreases below height of said longitudinal pathway is at or below a predetermined minimum height.

23. The method according to claim 22, further comprising the step of manufacturing said string of packaging cushions.

24. The method according to claim 23, further comprising the step of stopping the manufacture of packaging cushions if the height of said longitudinal pathway between the upper belt and the lower belt decreases below said predetermined minimum height.

25. The method according to claim 22, further comprising the step of conveying the string of packaging cushions to a packaging station if the height of said longitudinal pathway between the upper belt and the lower belt does not decrease below said predetermined minimum height.

26. The method according to claim 22, wherein a plurality of support members movably suspend said upper belt above said lower belt, said support members each having a proximal end pivotably attached to said upper belt, and a distal end pivotably attached to said lower belt, and wherein said distal and proximal ends each are configured to pivot in unison about an axis of rotation that is substantially perpendicular to said longitudinal pathway.

* * * * *

UNITED STATES PATENT AND TRADEMARK OFFICE
CERTIFICATE OF CORRECTION

| | | |
|---|---|---|
| PATENT NO. | : 7,231,749 B2 | Page 1 of 1 |
| APPLICATION NO. | : 10/933195 | |
| DATED | : June 19, 2007 | |
| INVENTOR(S) | : Garceau et al. | |

It is certified that error appears in the above-identified patent and that said Letters Patent is hereby corrected as shown below:

<u>Column 13,</u>
Lines 8-9, cancel "a predetermined minimum distance between said belts".

Signed and Sealed this

Sixth Day of November, 2007

JON W. DUDAS
*Director of the United States Patent and Trademark Office*